United States Patent
Wiener et al.

(10) Patent No.: US 9,176,255 B2
(45) Date of Patent: Nov. 3, 2015

(54) PERMEABILITY PREDICTION SYSTEMS AND METHODS USING QUADRATIC DISCRIMINANT ANALYSIS

(75) Inventors: Jacky M. Wiener, Aurora, CO (US); Muthukumarappan Ramurthy, Greenwood Village, CO (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 14/362,358

(22) PCT Filed: Dec. 8, 2011

(86) PCT No.: PCT/US2011/063969
§ 371 (c)(1),
(2), (4) Date: Jun. 2, 2014

(87) PCT Pub. No.: WO2013/085521
PCT Pub. Date: Jun. 13, 2013

(65) Prior Publication Data
US 2015/0039235 A1 Feb. 5, 2015

(51) Int. Cl.
*G06F 19/00* (2011.01)
*G01V 99/00* (2009.01)
*G01V 1/50* (2006.01)
*E21B 47/06* (2012.01)
(Continued)

(52) U.S. Cl.
CPC .............. *G01V 99/00* (2013.01); *E21B 47/06* (2013.01); *E21B 49/008* (2013.01); *E21B 49/02* (2013.01); *G01V 1/50* (2013.01); *G01V 9/02* (2013.01); *G01V 2210/6246* (2013.01)

(58) Field of Classification Search
CPC .. E21B 43/006; E21B 43/305; G01V 2200/00
USPC ............................... 702/12, 13, 14, 182–185
See application file for complete search history.

(56) References Cited

U.S. PATENT DOCUMENTS

| | | | |
|---|---|---|---|
| 5,251,286 A | 10/1993 | Wiener et al. | |
| 5,355,313 A | 10/1994 | Moll et al. | |

(Continued)

FOREIGN PATENT DOCUMENTS

WO WO-2013/085521 6/2013

OTHER PUBLICATIONS

Dubois, Martin K., et al., "Comparison of Four Approaches to a Rock Facies Classification Problem", Computers & Geosciences, (May 2007), p. 599-617, vol. 33, No. 5.

(Continued)

*Primary Examiner* — Edward Raymond
(74) *Attorney, Agent, or Firm* — Krueger Iselin LLP; Benjamin Fite

(57) ABSTRACT

Permeability prediction systems and methods using quadratic discriminant analysis are presented. At least one disclosed method embodiment includes: acquiring formation property measurements at a plurality of positions along at least one borehole in a study area; identifying clusters in a plurality of points representing the formation property measurements at the plurality of postions; and determining a system permeability value for each cluster. Quadratic Discriminant Analysis ("QDA") is used to associate one the clusters with each position along the one or more boreholes, thereby determining a system permeability prediction for each position. The total system permeability can then be predicted by aggregating the system permeability predictions.

18 Claims, 6 Drawing Sheets

(51) Int. Cl.
  *E21B 49/00* (2006.01)
  *E21B 49/02* (2006.01)
  *G01V 9/02* (2006.01)

(56) References Cited

U.S. PATENT DOCUMENTS

| | | | |
|---|---|---|---|
| 5,884,295 | A | 3/1999 | Moll et al. |
| 6,140,816 | A | 10/2000 | Herron |
| 7,054,751 | B2 | 5/2006 | Craig |
| 8,047,284 | B2 | 11/2011 | Ramurthy et al. |
| 8,374,974 | B2 | 2/2013 | Chen et al. |
| 2008/0162098 | A1 | 7/2008 | Suarez-Rivera et al. |
| 2009/0139322 | A1 | 6/2009 | Montaron et al. |
| 2009/0250211 | A1 | 10/2009 | Craig |
| 2012/0185225 | A1* | 7/2012 | Onda et al. .................. 703/10 |
| 2014/0222405 | A1* | 8/2014 | Lecerf et al. ................ 703/10 |

OTHER PUBLICATIONS

PCT International Search Report and Written Opinion, dated Apr. 17, 2012, Appl No. PCT/US11/63969, "Permeability Prediction Systems and Methods Using Quadratic Discriminant Analysis", filed Dec. 8, 2011, 11 pgs.

PCT International Preliminary Report on Patentability, dated Mar. 4, 2014, Appl No. PCT/US11/63969, "Permeability Prediction Systems and Methods Using Quadratic Discriminant Analysis", filed Dec. 8, 2011, 4 pgs.

Padmakar, A.S. "Geomechanics Coupled Reservoir Flow Simulation for Diagnostic Fracture Injection Test Design and Interpretation in Shale Reservoirs", SPE 166201, presented at the SPE Annual Technical Conference and Exhibition, Sep. 30-Oct. 2, 2013, New Orleans, Louisiana, USA.

Sharma, Pushpa et al., "Improved Permeability Estimates in Carbonate Reservoirs Using Electrofacies Characterization: A Case Study of Mumbai High South", Search and Discovery Article #41069, Nov. 19, 2012, 21 pgs.

Benaouda, D. et al., "Inferring the Lithology of Borehole Rocks by Applying Neural Network Classifiers to Downhole Logs: An Example from the Ocean Drilling Program", Geophys. J. Int. 136, 1999 RAS, 447-491.

Fertl, Walter H., et al., "Total Organic Carbon Content Determined from Well Logs", Society of Petroleum Engineers, SPE Formation Evaluation, Jun. 1988, 407-419.

De Wit, A. "Correlation Structure Dependence of the Effective Permeability of Heterogeneous Porous Media", American Institute of Physics, Phys. Fluids 7 (11), Nov. 1995, 2553-2562.

Ramurthy, Muthukumarappan et al., "Diagnostic Fracture Injection Test in Coals to Determine Pore Pressure and Permeability", SPE 75701, presented at the SPE Gas Technology Symposium, Apr. 30-May 2, 2002, Calgary, Alberta, CA.

Cramer, D. D., et al., "Diagnostic Fracture Injection Testing Tactics in Unconventional Reservoirs", SPE 163863, presented at the SPE Hydraulic Fracturing Technology Conference, Feb. 4-6, 2013, The Woodlands, Texas, USA.

EP Supplementary Search Report, dated Jul. 15, 2015, Appl No. 11877027.0, "Permeability Prediction Systems and Methods Using Quadratic Discriminant Analysis," filed Dec. 8, 2011, 7 pgs.

\* cited by examiner

FIG. 6

Linear Discriminant Analysis Classifications for Well RWF 524_20.

| | True Group | | | | | | | | |
|---|---|---|---|---|---|---|---|---|---|
| Put into Group | 1 | 2 | 3 | 4 | 5 | 6 | 7 | 8 | 9 |
| 1 | 25 | 14 | 5 | 18 | 7 | 0 | 2 | 0 | 0 |
| 2 | 5 | 79 | 3 | 0 | 3 | 0 | 2 | 2 | 0 |
| 3 | 3 | 15 | 20 | 3 | 13 | 5 | 7 | 3 | 0 |
| 4 | 10 | 6 | 8 | 112 | 5 | 0 | 9 | 13 | 0 |
| 5 | 6 | 11 | 4 | 8 | 12 | 10 | 3 | 3 | 0 |
| 6 | 3 | 5 | 3 | 5 | 13 | 18 | 18 | 0 | 0 |
| 7 | 2 | 0 | 3 | 8 | 3 | 4 | 19 | 1 | 0 |
| 8 | 3 | 8 | 0 | 2 | 2 | 2 | 0 | 39 | 4 |
| 9 | 1 | 1 | 0 | 11 | 0 | 3 | 5 | 1 | 38 |
| Total N | 58 | 139 | 46 | 167 | 58 | 42 | 65 | 62 | 42 |
| N Correct | 25 | 79 | 20 | 112 | 12 | 18 | 19 | 39 | 38 |
| Proportion | 0.431 | 0.568 | 0.435 | 0.671 | 0.207 | 0.429 | 0.292 | 0.629 | 0.905 |

N = 679   N Correct = 362   Proportion Correct = 0.533

FIG. 7

Quadratic Discriminant Analysis Classifications for Well RWF 524_20.

| Put into Group | True Group | | | | | | | | |
|---|---|---|---|---|---|---|---|---|---|
| | 1 | 2 | 3 | 4 | 5 | 6 | 7 | 8 | 9 |
| 1 | 43 | 1 | 0 | 0 | 0 | 0 | 1 | 0 | 0 |
| 2 | 1 | 120 | 1 | 1 | 3 | 0 | 0 | 0 | 0 |
| 3 | 1 | 6 | 37 | 1 | 0 | 1 | 0 | 1 | 0 |
| 4 | 1 | 0 | 3 | 149 | 0 | 0 | 8 | 10 | 0 |
| 5 | 6 | 10 | 2 | 2 | 55 | 1 | 1 | 2 | 0 |
| 6 | 0 | 0 | 1 | 0 | 0 | 39 | 2 | 0 | 0 |
| 7 | 6 | 1 | 2 | 6 | 0 | 1 | 53 | 0 | 0 |
| 8 | 0 | 1 | 0 | 7 | 0 | 0 | 0 | 47 | 0 |
| 9 | 0 | 0 | 0 | 1 | 0 | 0 | 0 | 2 | 42 |
| Total N | 58 | 139 | 46 | 167 | 58 | 42 | 65 | 62 | 42 |
| N Correct | 43 | 120 | 37 | 149 | 55 | 39 | 53 | 47 | 42 |
| Proportion | 0.741 | 0.863 | 0.804 | 0.892 | 0.948 | 0.929 | 0.815 | 0.758 | 1 |

N = 679  N Correct = 585  Proportion Correct = 0.862

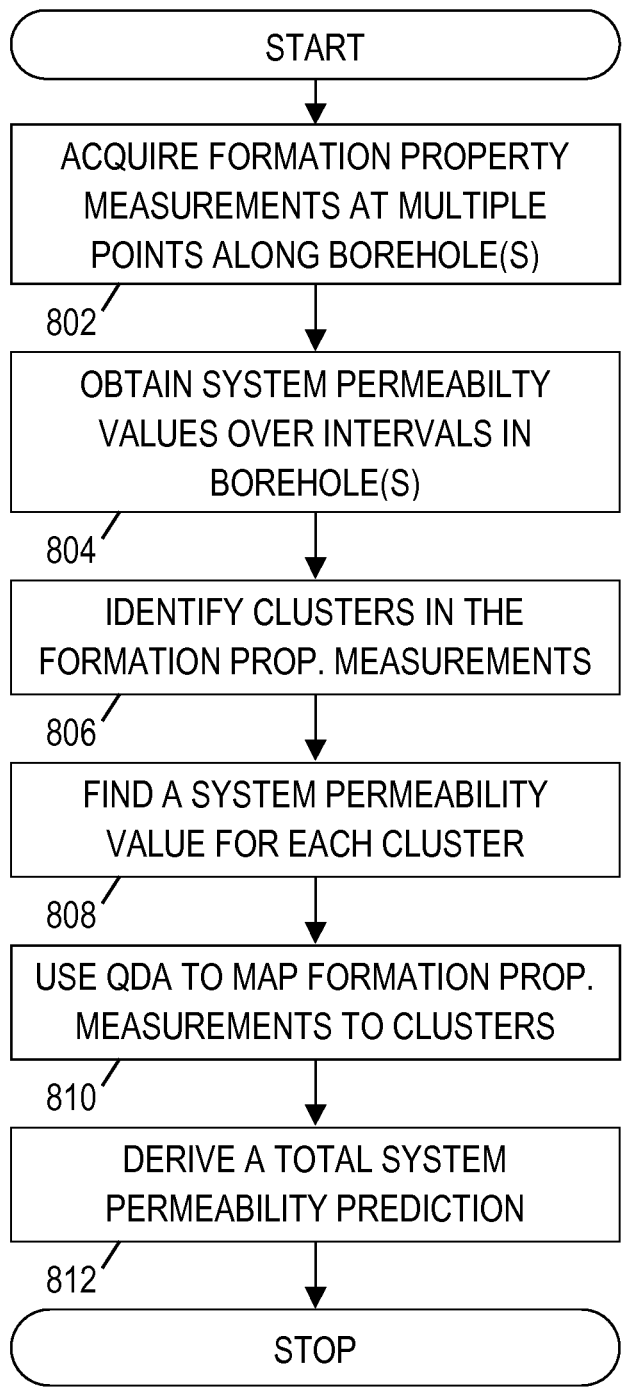

PERMEABILITY PREDICTION SYSTEMS AND METHODS USING QUADRATIC DISCRIMINANT ANALYSIS

BACKGROUND

Modern oil field operators demand a great quantity of information relating to the parameters and conditions encountered downhole. Among the types of information most sought is permeability, i.e., the ability of a given fluid (usually oil, water, gas, etc.) to flow through a given geologic formation. More particularly, operators desire knowledge of system permeability, i.e., the permeability of a given reservoir in situ, with the comparative stress and fracture conditions. System permeability provides a measure of the interconnectedness of the available porosity, and it is a function of fluid type, pore size and distribution, flow direction, grain size & sorting, shale content, non-connecting vugs, and fractures. It is an essential flow parameter for the characterization and production of the given reservoir. The oil and gas industry places great value on the accuracy of system permeability estimates, as they play an important role in overall reservoir management and development; i.e. economic feasibility determinations, reserve estimates, well spacing, reservoir characterization & simulation, completion designs, and secondary recovery projects.

Most commonly, the permeability of a reservoir is determined from rock samples & core analysis. However, such measurements typically occur under surface conditions, and the resulting permeability measurements are generally an order of magnitude higher than the in-situ "system permeability". Less commonly, pressure transient analysis (e.g., drill stem testing, well shut-in testing, and diagnostic fracture injection testing ("DFIT")) may be used to obtain permeability measurements suitable for stimulation design and reservoir simulation. Such permeability measures are performed over selected well intervals and hence may be poorly suited for a total system permeability prediction. Some researchers have proposed the use of empirical, statistical, and neural network techniques to predict formation permeability from wireline logs. However, while these techniques are effective for predicting core permeability, they do not solve for the system permeability existing in the reservoir under stress conditions.

BRIEF DESCRIPTION OF THE DRAWINGS

In the attached drawings:
FIG. 6 is a classification accuracy table using linear discriminant analysis;
FIG. 7 is a classification accuracy table using quadratic discriminant analysis;
and
FIG. 8 is a flow diagram of an illustrative method for predicting system permeability.

Figure 1:
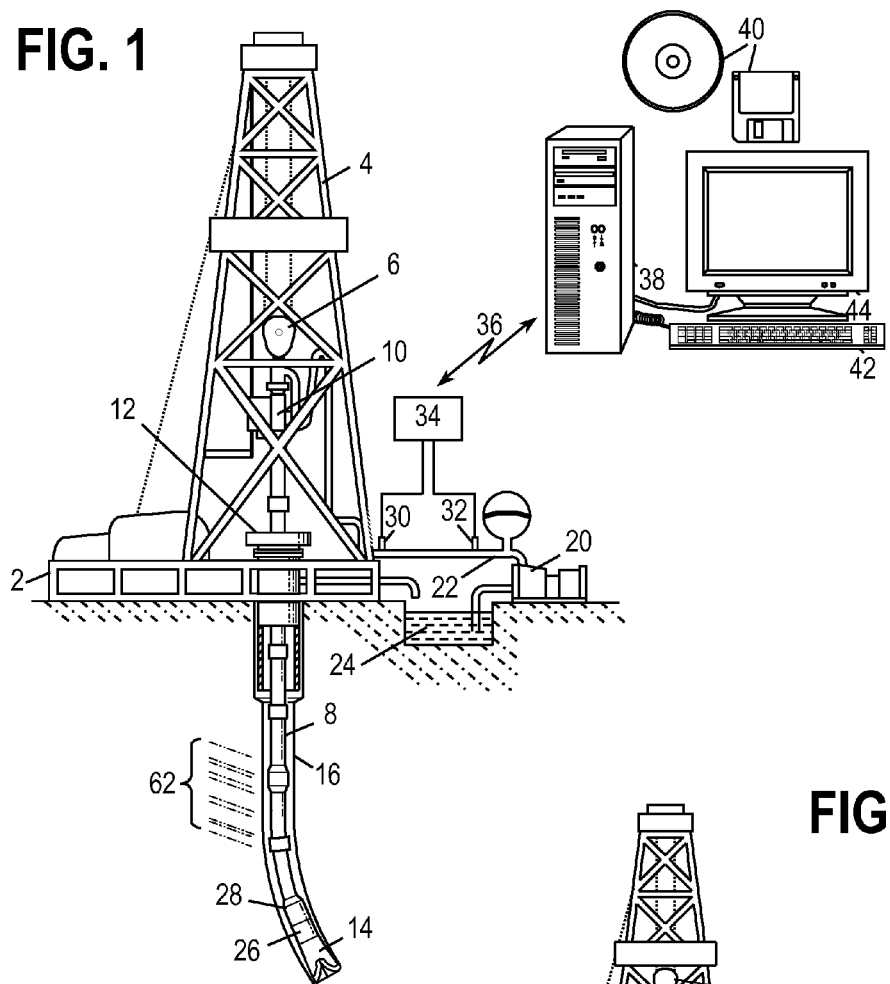
FIG. 1 shows an illustrative logging while drilling environment.

While the invention is susceptible to various alternative forms, equivalents, and modifications, specific embodiments thereof are shown by way of example in the drawings and will herein be described in detail. It should be understood, however, that the drawings and detailed description thereto do not limit the disclosure, but on the contrary, they provide the foundation for one of ordinary skill to discern the alternative forms, equivalents, and modifications that are encompassed with the described embodiments by the scope of the appended claims.

DETAILED DESCRIPTION

The issues identified in the background are at least in part addressed by the disclosed permeability prediction systems and methods using quadratic discriminant analysis. At least some method embodiments begin with geologic formation property logs from one or more boreholes. The geologic formation property logs serve as coordinates for points in a multidimensional data space, each point representing the measurements taken at a corresponding position along the borehole. A clustering algorithm groups these points, thereby forming representations of geologic rock layers in the regions penetrated by the borehole(s). A system permeability value is determined for each cluster. Thereafter, quadratic discriminant analysis (QDA) is used to partition the data space, enabling any permeability data point to be mapped to one of the clusters. The geologic formation property logs from the original and/or new boreholes can then be mapped to the clusters to determine system permeability predictions at each position along the boreholes, which predictions may be aggregated to predict a total system permeability.

To assist the reader's understanding of the disclosed systems and methods, we begin by describing environments suitable for their use and operation. Accordingly, FIG. 1 shows an illustrative logging while drilling (LWD) environment. A drilling platform 2 is equipped with a derrick 4 that supports a hoist 6 for raising and lowering a drill string 8. The hoist 6 suspends a top drive 10 that is used to rotate the drill string 8 and to lower the drill string through the well head 12. Connected to the lower end of the drill string 8 is a drill bit 14. As bit 14 rotates, it creates a borehole 16 that passes through various formations 62. A pump 16 circulates drilling fluid through a supply pipe 22 to top drive 10, downhole through the interior of drill string 8, through orifices in drill bit 14, back to the surface via the annulus around drill string 8, and into a retention pit 24. The drilling fluid transports cuttings from the borehole into the pit 24 and aids in maintaining the integrity of the borehole 16.

Logging instruments 26 may be positioned on the drill string 8 to collect measurements of formation properties and drilling parameters during the drilling process. A telemetry module 28 may provide communication between the logging instruments 26 and a surface interface 34 using any one of various available telemetry technologies. In one example, the surface interface 34 uses acoustic sensors 30 and 32 to detect telemetry carried via pressure pulses in the drilling fluid. A data processing system 38 is coupled to the surface interface 34 by a wired or wireless communications link 36 to control and acquire measurements from the logging instruments 26. The illustrated data processing system 38 is a general purpose computer with one or more input devices 42 and one or more output devices 44 for interacting with a user. Software on information storage media 40 (or in the computer's internal memory) configures the computer's internal processor(s) to acquire formation property measurements and derive a total system permeability prediction for display to the user.

Figure 2:
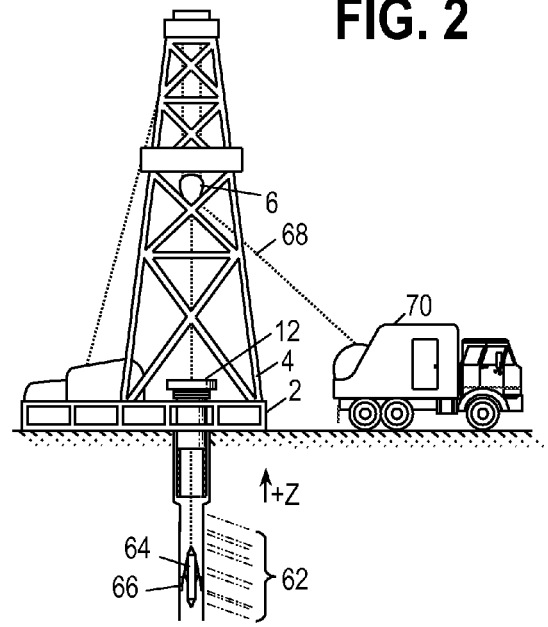
FIG. 2 shows an illustrative wireline drilling environment.

At various times during the drilling process, the drill string 8 is removed from the borehole as shown in FIG. 2. While the drill string 8 is absent, wireline logging operations can be conducted using a wireline logging tool 64, i.e., a sensing instrument sonde suspended by a cable 68 having conductors for transporting power to the tool and telemetry from the tool to the surface. The logging tool 64 may have centralizing arms 66 that center the tool within the borehole as the tool is pulled uphole past formations 62. A logging facility 70 collects formation property measurements from the logging tool 64, and includes computing facilities for processing and storing the measurements gathered by the logging tool. Among other things, the computing facilities may derive total system permeability predictions from the formation property measurements.

FIGS. 1 and 2 show the most common logging techniques, but other suitable techniques for collecting formation property measurements exist and may be used. Tubing-conveyed logging instruments, fluid conveyed sensors, and distributed sensing systems may be used to measure formation parameters from within the borehole. Multiple boreholes (including multiple lateral branches from an initial borehole) can be drilled into the region of interest to increase the amount of information available for predicting total system permeability.

While a wide range of formation property measurements are conducive to predicting system permeability, the most common ones are expected to be gamma ray logs, resistivity logs (shallow, medium, and deep), neutron porosity NPHI, bulk density RHOB, photoelectric index PE, and acoustic slowness (DT). The following discussion presents an example based on only two geologic formation property logs to enable visualization of the underlying principles. In practice, six or more geologic formation property logs would typically be used.

Figure 3A:
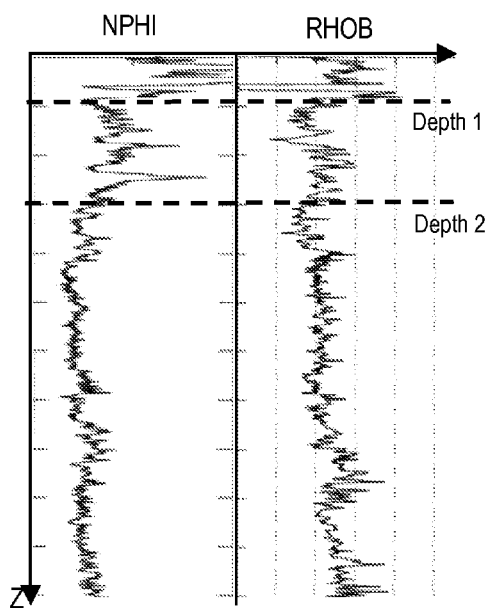
FIG. 3A shows illustrative wireline log data for a borehole.

FIG. 3A shows two illustrative geologic formation property logs as a function of depth: neutron porosity and bulk density. At a given position in the borehole, the measured formation properties represent coordinates of a point in a data space. For example, at depth 1, the measured porosity and density values serve as x and y coordinates of a first point, while the measurements at depth 2 serve as coordinates of a second point. If the borehole is sampled at a regular spacing (e.g., 20 cm spacing), points can be plotted in a two dimensional data space representing the measurements at those positions. To prevent any one measurement from dominating the prediction process based on scale alone, the measurements are preferably normalized so that each measurement has a similar dynamic range with comparable upper and lower limits. In some embodiments, each formation property log is normalized to a range between zero and one. As the resistivity measurements have a particularly large dynamic range, the logarithm of these measurements is taken before being normalized to the desired range.

Unlike geologic formation property logs, system permeability measurements are normally collected over a borehole interval rather than being a localized measurement. A number of permeability measurement techniques are available, including well test analysis (WTA), drill stem testing (DST), and diagnostic fracture injection testing (DFIT). These techniques generally involve isolating a portion of the borehole and subjecting that portion to pressure/flow transients and monitoring the pressure profile as the isolated region returns to steady state. The resolution varies based on the measurement technique, ranging from the entire well in well test analysis to small (~1 m) intervals measured from DFIT.

Figure 3B:
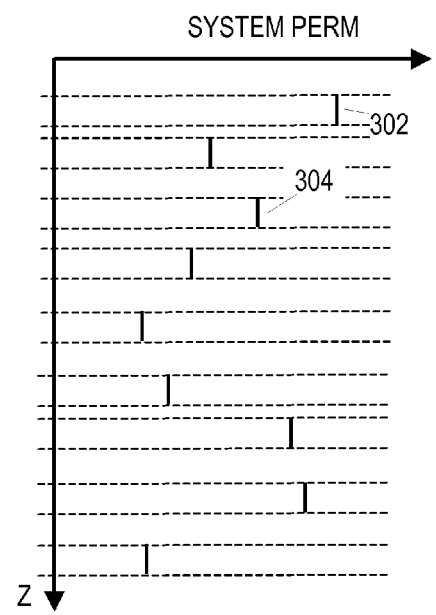
FIG. 3B shows illustrative system permeability data for that borehole.

FIG. 3B shows a log of system permeability measurements acquired by, e.g., drill stem testing. Each system permeability measurement corresponds to an interval, i.e., multiple sample points in the data space. Thus the data points for depth 1 and nearby positions are associated with system permeability measurement 302, while data points for depth 2 and nearby positions are associated with system permeability measurement 304. The system permeability measurement intervals may not be evenly sized or equally spaced, and not all data points may have corresponding system permeability measurements. Additional information about system permeability values may be taken from other sources as discussed further below.

Figure 4A:
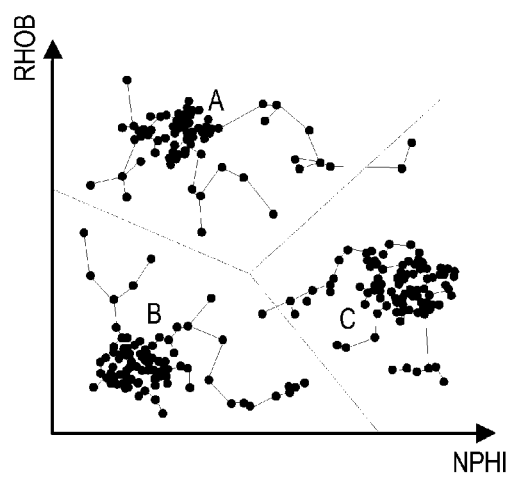
FIG. 4A shows illustrative clustering of wireline log data.

FIG. 4A shows a two dimensional data space, with normalized neutron porosity measurements forming the x-coordinate axis and normalized density measurements forming the y-coordinate axis. Illustrative data points have been plotted, representing formation property measurements in one or more boreholes. Such data points tend to form groups representing different geologic formation types, e.g., shale, sandstone, limestone, etc. Often the groups are disperse and overlapping, so a clustering algorithm may be employed to partition the set of data points into representative groups. Suitable clustering algorithms include hierarchical clustering and k-means clustering. FIG. 4A shows an illustrative division of the data points into three clusters (A, B, C) as illustrated by the lines connecting the data points.

Figure 5:
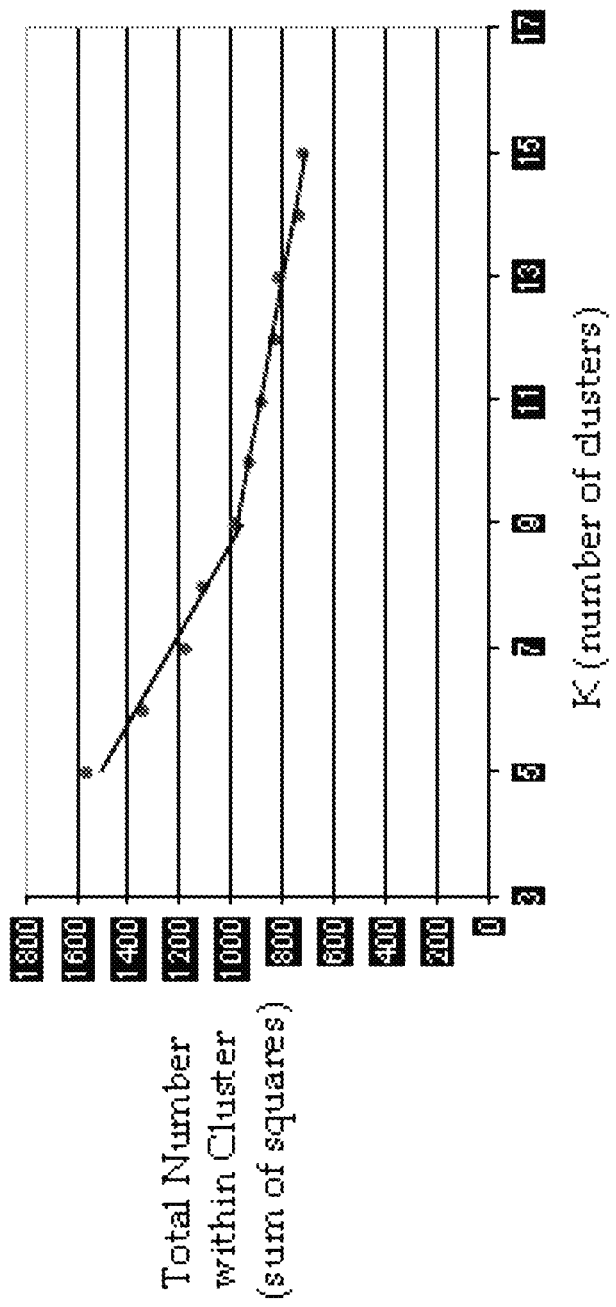
FIG. 5 shows a k-means clustering cross-plot analysis.

The appropriate number of clusters for any given can be determined by inspection or by some other technique such as the k-means clustering cross-plot analysis illustrated in FIG. 5. K-means cluster cross-plot analysis is performed by iteratively selecting different numbers of clusters, performing the k-means clustering algorithm, and calculating the resulting sum of squares for the intra-cluster numbers. The intra-cluster numbers are the distances between each point and the centroid of the cluster to which it belongs, the centroid being determined by averaging all of the points in the cluster. In the example illustrated in FIG. 5, the intra-cluster error falls monotonically as the number of clusters increases. Note that there is an inflection point at k=9 where the slope changes. As the number of clusters increases beyond 9, the number falls more slowly than before. Such an inflection point is often taken as an indication of the proper number of clusters useful for representing the set of data points.

Once a clustering solution with an optimal number of clusters has been found, the clusters are assumed to represent different formation units. A system permeability value is determined for each cluster. In most cases, at least some of the points in each cluster have associated system permeability measurements as discussed above, enabling a system permeability value to be determined for each cluster by averaging or combining the associated system permeability measurements in some fashion. Some method embodiments may determine a system permeability value for each cluster based on a statistical analysis of geologic formation property logs and system permeability measurements throughout the reservoir region. In many cases, a geologist may be able to discern the type of formation represented by each cluster and determine an appropriate system permeability value based on empirical knowledge. Such empirical determinations may be used as a check on the system permeability values derived through other means and/or to fill in values for any clusters lacking such derived system permeability values. In some cases, manual adjustments may be made to the clusters to improve their correspondence with "natural" correspondences of data point groups with system permeability measurements. (Such natural correspondences may be determined by comparing covariance matrices between clusters—similar covariance matrices may suggest merging those clusters.) It is contemplated that each cluster will be assigned a single, representative system permeability value.

To make use of these clusters and their associated system permeabilities, the disclosed methods and systems employ quadratic discriminant analysis to map arbitrary data points to a corresponding cluster. Discriminant analysis is a statistical method which is used to help understand the relationship between a "dependent variable" (i.e., cluster membership) and one or more "independent variables" (i.e., formation property log data). The dependent variable is the value to be explained from the values of the independent variables. This technique is similar to multivariate regression analysis except with regards to the nature of the dependent variable, which in this case is a "categorical variable" (a discrete value, as opposed to a continuous value). This statistical approach is well suited to interpreting system permeability from formation property log data because system permeability measurements are generally given as one value for the entire reservoir interval, better matching up with formation property data clusters that represent natural groups of reservoir units. As an added benefit of this approach, the clustering of the formation property data in shale gas/oil & tight-gas reservoirs is usually related to litho-facie boundaries, net pay thicknesses, and geomechanical units.

Quadratic discriminant analysis (QDA) operates with a set of discriminant functions, one for each cluster:

$$g_k(x) = w_0 + \sum_{i=1}^{d} w_i x_i + \sum_{i=1}^{d} \sum_{j=1}^{d} w_{ij} x_i x_j$$

where $x_i$ is the ith normalized formation property measurement, d is the number of normalized formation property measurements, $w_i$ and $w_{ij}$ are coefficients, and k is the cluster index. If $g_h(x) > g_k(x)$ for all $k \neq h$, then data point x is assigned to cluster h. Various commercially available software packages are available to determine the discriminant functions when given the data points and their cluster memberships.

Figure 4B:
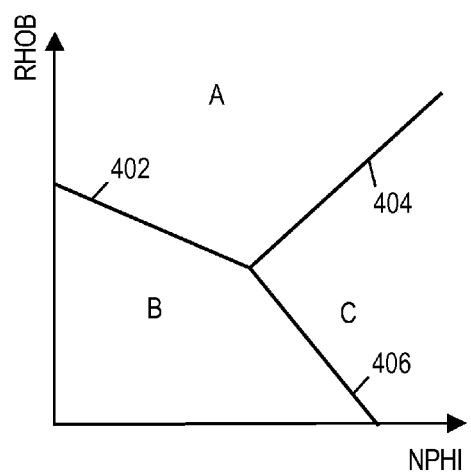
FIG. 4B shows illustrative clusters in data space with associated system permeability values.

FIG. 4B shows an illustrative division of the data space in accordance with the QDA functions derived for the clusters shown in FIG. 4A. Lines 402, 404, 406 illustrate the boundaries between the QDA-determined cluster memberships. These lines are also presented in ghost form on FIG. 4A, showing that the QDA-determined cluster memberships need not be 100% correct. It can be seen in FIG. 4A that certain members of cluster A are actually misclassified by the QDA functions as belonging to cluster C, while one of the points for cluster C is misclassified as belonging to cluster B. Nevertheless, such errors may be tolerated as QDA classification is much faster than exhaustively searching the set of points in each cluster for the best match to the data point we wish to classify.

The advantage of QDA over the closely related linear discriminant analysis (LDA) is illustrated by comparing the tables in FIGS. 6 and 7. Seven normalized geologic formation property logs (gamma ray, shallow resistivity, medium resistivity, deep resistivity, neutron porosity NPHI, bulk density RHOB, and photoelectric index PE) from well RWF 52420 were clustered into 9 clusters (this is the same data used to generate FIG. 5). LDA discriminants were calculated and applied with the results given in FIG. 6, and QDA discriminants were calculated and applied with the results given in FIG. 7. LDA classified only 53% of the points into the correct cluster, while QDA correctly classified over 86%. This improvement makes QDA the preferred option when classifying data points for total system permeability predictions. The accuracy of the discriminants can be tested on the data used to find the discriminants ("training data") and/or on non-training data that has been held in reserve to evaluate the QDA. Inadequate performance can be addressed by increasing the amount of training data points, increasing the number of clusters, and/or changing the geologic formation property logs.

Once the classification performance is satisfactory, the QDA discriminants are applied to all of the geologic formation property logs in the study area, thereby associating each position in each borehole with a cluster, thereby determining a system permeability value for each position in each borehole. The system permeability values are scaled to match the borehole span represented by each data point, enabling a total system permeability prediction to be generated by summing the system permeability values associated with each position in the borehole. Moreover, a plot of the system permeability values versus borehole position will reveal natural reservoir units grouped by permeability values. These results can be used in a variety of ways, including reservoir characterization/earth modeling studies for net pay determinations, hydrocarbon reserve analysis, completion designs, and reservoir simulation studies.

FIG. 8 shows an illustrative flow diagram for predicting permeability. In block 802, a logging tool suite acquires formation property measurements multiple points along one or more boreholes in the study area. In block 804, pressure transient or diagnostic fracture injection testing is used to obtain system permeability measurements over intervals in the borehole(s). In block 806, the formation property measurements are normalized and subjected to a clustering process to identify clusters in the normalized formation property measurements.

As previously discussed, such clusters are expected to represent different geological units in the study area. In block 808, system permeability values are determined for each cluster based at least in part the system permeability measurements obtained previously (in block 804). We note that each interval over which system permeability measurements are gathered is likely to correspond to only one or two clusters. This fact makes it easier to separate out the contributions of each geographical unit to the system permeability measurements, e.g., by averaging or a statistical analysis over the points in each cluster.

In block 810, QDA is used to determine a corresponding cluster for each of the logged positions in the borehole(s) in the study area. The associated permeability value for each of these clusters can then be plotted to give an estimated system permeability value for each position in the borehole(s). In block 812, these system permeability logs are used to derive a total system permeability prediction, which can then be displayed to a user or stored for later use by another process. This system permeability prediction method has proven accurate when applied to wireline logs and well test data from unconventional reservoirs including tight gas sands, shale gas reservoirs, and shale oil reservoirs.

The method of FIG. 8 can be implemented on a general purpose computer by software stored on disk or in memory. One or more processors execute the software, which configures them to carry out the actions identified above. Note that these actions need not be carried out in a strictly sequential fashion, but rather they may be re-ordered, pipelined, and/or carried out in parallel. As just one example, clustering and QDA may be performed before the system permeability measurements are acquired and processed to determine a permeability value for each cluster.

One of ordinary skill, upon reviewing the foregoing disclosure, will recognize various alternative forms, equivalents, and modifications to disclosed elements and operations. For example, the system permeability measurements may be replaced by production flow rate measurements to obtain predictions of overall flow rate parameters. As another example, the system permeability measurements can be extrapolated from core sample permeability measurements under ambient or stress conditions. Where possible, the following claims embrace such alternative forms, equivalents, and modifications.

What is claimed is:

1. A method for predicting total system permeability of a geologic formation, comprising:
acquiring formation property measurements at a plurality of positions along at least one borehole in the geologic formation;
identifying clusters in a plurality of points representing the formation property measurements at the plurality of postions;
determining a system permeability value for each cluster;
applying Quadratic Discriminant Analysis ("QDA") to associate each of multiple positions in one or more boreholes with a corresponding cluster based on formation property measurements, thereby obtaining a system permeability prediction for each of said multiple positions; and
predicting total system permeability based at least in part on an aggregation of the system permeability predictions for each of said multiple positions.

2. The method of claim 1, wherein said determining includes:
employing pressure transient tests to obtain system permeability measurements over multiple intervals in the at least one borehole.

3. The method of claim 2, wherein said determining further includes:
associating a system permeability measurement with each of said plurality of points representing positions in an interval from which the system permeability measurement was obtained; and
combining the system permeability measurements associated with the points in a given cluster to determine the system permeability value for that cluster.

4. The method of claim 3, wherein said combining includes averaging.

5. The method of claim 3, wherein said combining includes applying a statistical analysis across the clusters to isolate the contributions of each cluster to the obtained system permeability measurements.

6. The method of claim 1, wherein said determining includes:
employing diagnostic fracture injection testing (DFIT) to obtain system permeability measurements corresponding to individual points; and
averaging the system permeability measurements associated with points in a given cluster to determine the system permeability value for that cluster.

7. The method of claim 1, wherein said determining includes:
employing core sample permeability measurements to estimate system permeability measurements corresponding to individual points; and
averaging the estimated system permeability measurements associated with points in a given cluster to determine the system permeability value for that cluster.

8. The method of claim 1, wherein said identifying includes:
employing a k-means clustering technique to determine an optimum number of clusters; and
finding a k-means clustering solution having the optimum number of clusters.

9. The method of claim 1, wherein said identifying includes basing coordinates for the plurality of points on normalized formation property measurements.

10. A system for predicting total system permeability of a geologic formation, comprising:
a memory that stores total system permeability prediction software;
at least one processor coupled to the memory to execute the software, wherein the software configures the processor to:
acquire formation property measurements at a plurality of positions along at least one borehole in the geologic formation;
identify clusters in a plurality of points representing the formation property measurements at the plurality of postions;
determine a system permeability value for each cluster;
apply Quadratic Discriminant Analysis ("QDA") to associate each of multiple positions in one or more boreholes with a corresponding cluster based on formation property measurements, thereby obtaining a system permeability prediction for each of said multiple positions;
predict total system permeability based at least in part on an aggregation of the system permeability predictions for each of said multiple positions; and
display the predicted total system permeability.

11. The system of claim 10, wherein as part of said determining, the software configures the at least one processor to employ pressure transient test results to obtain system permeability measurements over multiple intervals in the at least one borehole.

12. The system of claim 11, wherein as part of said determining the software further configures the at least one processor to:
associate a system permeability measurement with those points representing positions in an interval from which the system permeability measurement was obtained; and
combine the system permeability measurements associated with the points in a given cluster to determine the system permeability value for that cluster.

13. The system of claim 12, wherein as part of said combining the software configures the at least one processor to average the system permeability measurements associated with points in a given cluster.

14. The system of claim 12, wherein as part of said combining the software configures the at least one processor to apply a statistical analysis across the clusters to isolate contributions of each cluster to the obtained system permeability measurements.

15. The system of claim 10, wherein as part of said determining, the software configures the at least one processor to:
employ results of diagnostic fracture injection testing (DFIT) to obtain system permeability measurements corresponding to individual points; and
average the system permeability measurements associated with points in a given cluster to determine the system permeability value for that cluster.

16. The system of claim 10, wherein as part of said determining, the software configures the at least one processor to:
estimate system permeability measurements corresponding to individual points based on core sample permeability measurements; and average the estimated system permeability measurements associated with points in a given cluster to determine the system permeability value for that cluster.

17. The system of claim 10, wherein as part of said identifying, the software configures the at least one processor to:
   determine an optimum number of clusters using a k-means clustering technique; and
   find a k-means clustering solution having the optimum number of clusters.

18. The system of claim 10, wherein as part of said identifying, the software configures the at least one processor to normalize the formation property measurements and use the normalized formation property measurements as coordinates for the plurality of points.

* * * * *